UNITED STATES PATENT OFFICE.

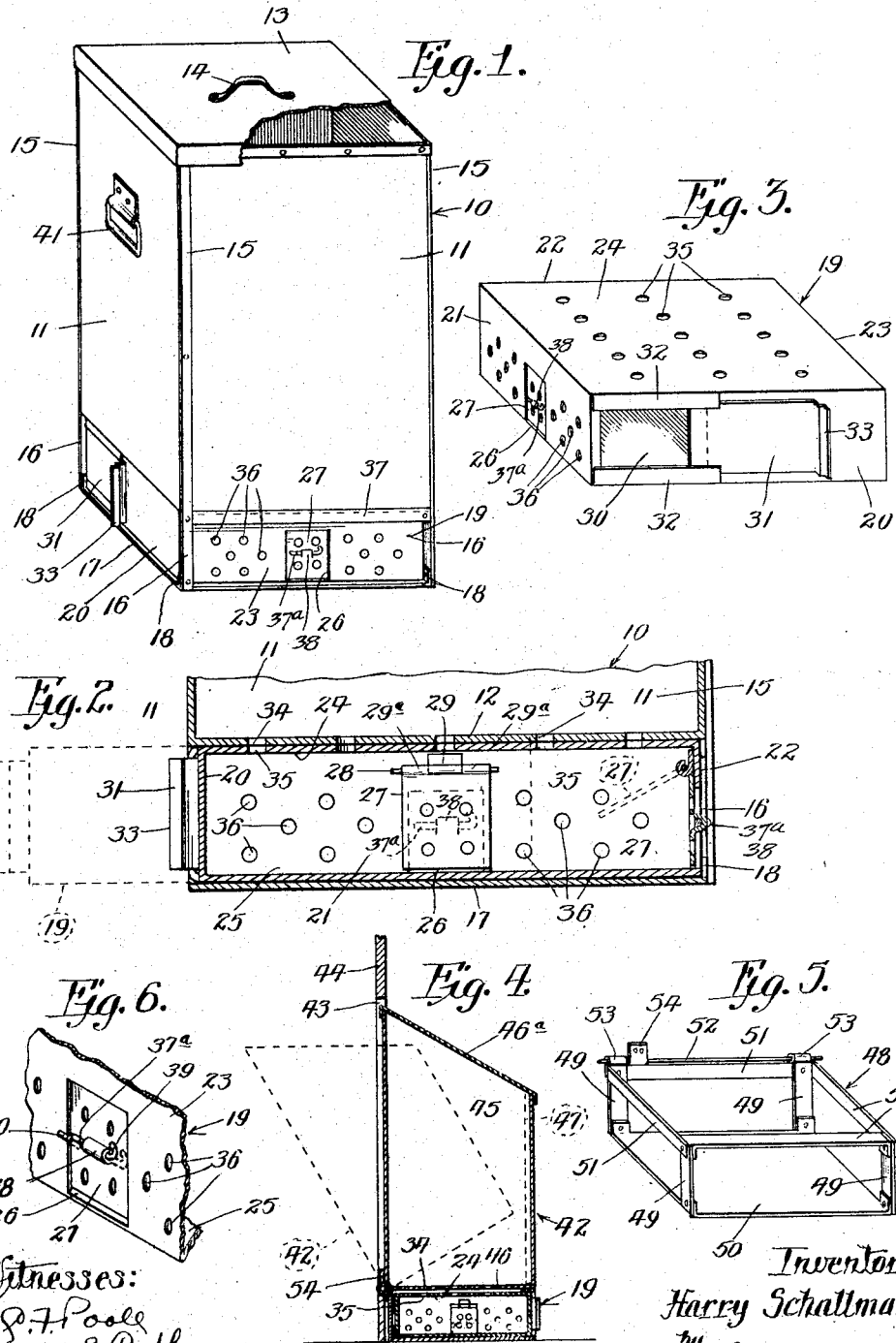

HARRY SCHALLMAN, OF CHICAGO, ILLINOIS.

COMBINED GARBAGE-CAN AND RAT-TRAP.

1,223,525.  Specification of Letters Patent.  Patented Apr. 24, 1917.

Application filed November 5, 1915. Serial No. 59,710.

*To all whom it may concern:*

Be it known that I, HARRY SCHALLMAN, a citizen of the United States, and a resident of Chicago, in the county of Cook and State of Illinois, have invented certain new and useful Improvements in Combined Garbage-Cans and Rat-Traps; and I do hereby declare that the following is a full, clear, and exact description thereof, reference being had to the accompanying drawings, and to the letters of reference marked thereon, which form a part of this specification.

This invention relates to a combined garbage can and rat trap.

Among the objects of my invention is to provide a combined garbage can and rat trap of such construction that the trap may be readily removed from beneath the bottom of the can, when it is desired to clean the trap or destroy the rodents caught thereby, and, further, to provide a construction wherein the odors of the matter deposited in the can may enter and penetrate the trap and serve as the bait therefor. A further object of the invention is to provide a construction wherein the can and trap may be made and used as a complete unit.

The invention consists further in the matters hereinafter described and more particularly pointed out in the appended claims.

In the accompanying drawings—

Figure 1 is a perspective view of a combined garbage can and rat trap constructed in accordance with my invention;

Fig. 2 is a vertical sectional view taken through the bottom wall of the can and trap located therebelow;

Fig. 3 is a perspective view of the trap completely removed from the garbage can;

Fig. 4 is a side elevational view with parts in section, showing a rat or like trap embodying the features of my invention applied to that type of garbage can which is pivotally mounted in an opening formed in a back yard or like fence;

Fig. 5 is a perspective view of parts shown in Fig. 4; and

Fig. 6 is a front elevational view of one of the self closing doors of the trap and its locking device.

In Figs. 1 and 2 of the accompanying drawings, I have shown a rat or like trap embodying the features of my invention as being combined with a garbage or other refuse can or receptacle 10 of the portable type. Said can 10 is preferably made of sheet metal and comprises connected upright side walls 11, 11 and a bottom wall 12. As illustrated, said can 10 is made rectangular in form, and its open upper end is closed by a suitable removable lid or cover 13, the latter being provided at the top thereof with a handle 14. Said can 10 is reinforced at each of its four corners by a metal brace rod 15, 15 riveted or otherwise secured upon the outside of the can body and extending the full length thereof. Said brace rods 15, 15 extend equal distances below the bottom wall 12 of the can and form legs 16, 16 at the corners thereof. Said legs 16, 16 support the can in an upright position with its bottom wall 12 above the ground. Located below said bottom wall 12 is a flat base plate 17 preferably made of sheet metal and substantially the same size as said bottom wall 12. Said base plate 17 is located within the legs 16, 16 and is secured to the lower extremities thereof. When the can 10 is set upon its legs, said base plate 17 rests upon the ground. Any type of means may be employed for securing said base plate 17 to said legs 16, 16, but as shown in Fig. 1 of the drawings, said base plate 17 is provided at each of the four corners thereof with an upwardly extending, integral lug 18, 18, which is riveted or otherwise secured to the associated leg 16, 16.

It will be noted that there is a space formed between the bottom wall 12 of the can and said base plate 17. Slidably located in such space is a rat or like trap 19 preferably made of sheet metal and rectangular or box-like in form. (See Fig. 3.) Said trap 19 slidably rests on said base plate 17 and is made of such size as to fill the space between the bottom wall 12 and said base plate 17. Inasmuch as said base plate 17 rests on the ground, the trap 19 in effect rests on the ground, when the trap is located beneath the bottom wall of the can 10. As shown in Figs. 1, 2, and 3, said trap 19 comprises connected upright side or marginal walls 20, 21, 22, and 23, and top and bottom walls 24, 25. The upright marginal walls 20, 22 constitute the front and rear walls of the trap, while the upright marginal walls 21, 23 form the end walls of the same. The rear wall 22 and the end walls 21 and 23 are each provided with an opening forming a doorway 26, the latter being normally closed by a self closing door 27. Each door 27 is a trifle larger than its doorway, and said door is located inside of the trap. Said door 27 has hinged connection along its upper edge with the trap wall above the doorway, so that the door may be readily swung inward by the rodent entering the trap, but will immediately swing back into its closed position by the action of gravity thereon as soon as the rodent has passed the same. Each door 27 may be hinged to the trap wall in any desired manner in order to accomplish the purposes described, but, as shown, each door is hung on a horizontally arranged hinge or pintle rod 28 secured to the inner face of the trap wall above the doorway by means of a metal strap member 29. Said strap member 29 is secured to the trap wall and has its lower portion bent into tubular form and encircling the central portion of said hinge rod. Each door 27 is made of sheet metal and has portions 29$^a$ of its upper margin bent into tubular form about the associated pintle rod 28 on each side of said trap member 29. (See Fig. 2.)

The trap 19 resting practically on the ground, the lower edge of each doorway 26 is in effect substantially flush with the surface of the ground, and therefore each doorway is in a position readily reached by the animals to be caught. To permit the rat or animal to be removed from the trap, I provide an exit opening 30 in the front wall 20 thereof. Said opening 30 is normally closed by a sliding door 31, which may be moved endwise in channel-shaped guide members 32, 32 secured above and below said doorway 30. The inner end of said sliding door 31 is provided with an outwardly extending flange 33 constituting a handle for said door as well as a stop member, which, when it comes into contact with the opposed ends of said guide members 32, 32, limits the endwise movement of said sliding door, when the latter reaches its position completely closing said exit opening 30.

As shown in Fig. 2, the top wall 24 of the trap 19 contacts against the under side of the bottom wall 12 of the receptacle or can 10. Said contacting walls are provided with registering openings or holes 34, 35, so that the odors of the matter deposited in the can 10 may enter and penetrate the trap 19 and serve as bait therefor. Manifestly, it is unnecessary to place bait in the trap, when the latter is inserted beneath the can 10. The end and front walls of the trap are each provided with a plurality of holes or apertures 36, 36 whereby air may circulate through the trap and, further, to permit water to enter the trap when the same is completely removed from the can 10 and submerged in a body of water for the purpose of destroying the rodents caught in the trap by drowning, as well as for the purpose of washing out the trap and maintaining the same in a clean and sanitary condition. The trap 19 is inserted beneath the bottom wall 12 of the can 10 by sliding the same into the space between said bottom wall 12 and the base plate 17, and removed from the can by withdrawing said trap from said space. The legs 16, 16 secured to the side wall of the can 10 that substantially alines with the rear wall 22 of the trap 19 are spaced apart a distance less than the width of the trap, while the legs secured to the opposite wall of the can are spaced apart a distance sufficient to permit the trap 19 to slide therebetween. The trap 19, when inserted beneath the bottom wall of the can 10, contacts against said first mentioned set of legs 16, 16, and the latter serve as stop members and prevent the trap from being pushed beyond its proper position beneath said can. In order to prevent the trap from being withdrawn endwise from beneath the can 10, I provide on each side of the can a guard strip 37, 37, which extends downward below the bottom wall 12 and overlaps the upper marginal portion of the associated end wall 21, 23 of the trap. (See Fig. 1.)

When the trap 19 is to be completely removed from beneath the can for the purpose of destroying the rats caught therein, it is necessary to first lock each door 27 in its closed position, in order to prevent said doors from swinging open and permitting a rodent to escape from the trap. To accomplish this purpose, I provide each door with a locking member in the form of an endwise slidable locking bolt 37$^a$. Said bolt is slidably mounted on the exterior face of the door 27 in a tubular portion 38 struck up from the door. One end of the bolt is provided with a handle 39, and the other end of said bolt is offset outwardly to provide a catch 40 adapted to engage over the associated edge of the doorway, when the bolt is moved endwise into its locking position. (See full lines, Fig. 6.) The length of the bolt is less than the extreme width of the door 27, and consequently said bolt does not extend beyond the side edges of the door when said bolt is in its unlocking position. (See dotted lines Fig. 6.) When in such position said bolt 37$^a$ is carried by the door when the latter is swung inward.

As shown in Fig. 1, the can or receptacle 10 is provided on opposite sides thereof with handles 41 whereby the can may be raised for the purpose of dumping the same. In Fig. 2 I have shown in dotted lines the trap 19 as being partially withdrawn from beneath the can 10.

In Figs. 1 and 2, I have shown said rat trap 19 as being applied to a portable type of garbage or other refuse can, while in Figs. 4 and 5 I have illustrated said trap as being combined with a self dumping type of garbage can. As shown in Fig. 4, the can 42 is placed in a suitable opening 43 formed in a back yard or other fence 44. Said can 42 is hinged along one of its bottom edges so that the can may be readily swung outward and downward through said opening for the purpose of dumping said can. As illustrated, said can is rectangular in form and has connected upright side walls 45, 45 and a bottom wall 46. A suitable lid or cover 46ᵃ may be used to close the open upper end of the can 42. Each corner of the can body is reinforced by a metal bracing strip 47, 47, the latter extending the full length of the can, but not below the bottom wall 46 thereof, as in case of the similar part shown in Figs. 1 and 2. Located beneath said bottom wall 46 is an open box-shaped metal frame 48 having four upright corner posts 49, 49, each being in substantially vertical alinement with the associated bracing strip 47 and forming in effect a downward continuation thereof. The bottom wall of said frame 48 is formed by a base plate 50, which rests on the ground and is similar to the like part 17 shown in Figs. 1 and 2. The upper ends of said posts 49, 49 are connected by metal strips 51, 51, which surround the upper portion of said frame 48. The can 42 seats on said frame 48, and the latter supports the bottom wall 46 of the can above the base plate 50. The trap 19 is slidably mounted in the frame 48, and said trap seats on the upper face of the base plate 50. The top wall 24 of the trap contacts with the under side of the bottom wall 46, and said walls are provided with registering holes or apertures 34, 35, the same as the corresponding parts shown in Figs. 1 and 2. The can 42 is hinged to the frame 48 therebelow by a horizontally arranged rod 52. Such hinge construction is made by providing upright lugs 53, 53 on the frame and depending lugs 54, 54 on the can, said lugs being bent about said rod 52, as shown. In order to prevent the frame 48 and trap 19 from being tilted when the can 52 is being dumped, the frame may be weighted down in any desired manner or attached to the fence 44.

From the above it is clear that my invention may be applied to a tilting, as well as to a portable, can, and, in either case, the odors of the matter contained in the can serve as bait for the trap, and also that the trap rests on the ground and will always be in a position readily accessible to rats or rodents that it is designed to capture. In either case, the trap is located below the bottom wall of the can and therefore does not interfere with the use of the can nor the dumping thereof. Moreover, the trap, being combined with a garbage can, is always at the place where the rats are most likely to congregate for food, and thereby is more efficient than if set at some place removed from the can. When the trap is applied to the portable type of can, or to a dumping kind of can, the can and trap may be assembled at the time of making and be set up and used as a complete unit.

Although I have shown and described in detail a combined garbage can and rat trap, it is to be of course understood that the exact details of construction and arrangement of parts illustrated may be variously changed and modified without departing from the spirit of my invention, and I do not wish to be confined to the exact details of construction and arrangement of parts shown, except as pointed out in the annexed claims.

I claim as my invention:

1. A portable garbage or other refuse can having a bottom wall, legs secured to said can and extending below said bottom wall for supporting said can and its bottom wall above the ground, a rat trap located beneath said bottom wall and being slidably and removably mounted between said legs, said trap having a top wall, upright side walls, and a bottom wall, the latter being substantially flush with the surface of the ground when the trap is located beneath said can; the top wall of said trap being adjacent the bottom wall of said can, and said walls being provided with registering holes whereby the odors of the matter deposited in said can may enter said trap and serve as bait therefor, said trap being provided in one of its upright side walls with a doorway, through which a rodent may enter said trap, an inwardly swinging door for normally closing said doorway, said trap being provided with an opening permitting the rodent caught by said trap to be removed therefrom, and a door for closing said opening.

2. A portable garbage or other refuse can having a bottom wall, legs secured to said can and extending below said bottom wall for supporting said can and its bottom wall above the ground, a base plate secured to said legs and adapted to contact with the ground, a rat trap having a bottom wall, a top wall, and upright side walls, said trap being removably inserted beneath the bottom wall of said can and having its bottom wall slidably mounted on said base plate, the top wall of said trap being adjacent the bottom wall of said can, and said walls being provided with registering holes whereby the odors of the matter deposited in said can may enter said trap and serve as bait therefor, said trap being provided in one of its upright side walls with a doorway, through which a rodent may enter said trap, an inwardly swinging door for normally closing said doorway, said trap being provided with an opening permitting the rodent caught by said trap to be removed therefrom, and a door for closing said opening.

3. A rat or like trap made of sheet metal and having connected side, top, and bottom walls, one of the side walls of said trap being provided with an opening through which a rodent may enter said trap, an inwardly swinging door for normally closing said entrance opening, a locking member for locking said door in closed position, said trap being provided in one of the other of its side walls with an opening whereby the rodents may be removed from said trap, a sliding door for closing said last named opening; and the side and top walls of said trap being provided with a plurality of holes, for permitting air and light to enter said trap.

In testimony, that I claim the foregoing as my invention I affix my signature in the presence of two witnesses, this 3rd day of November, A. D. 1915.

HARRY SCHALLMAN.

Witnesses:
 EUGENE C. WANN,
 CLARA L. PEOPLES.

Copies of this patent may be obtained for five cents each, by addressing the "Commissioner of Patents, Washington, D. C."